(12) United States Patent
Pisklak et al.

(10) Patent No.: US 11,434,746 B2
(45) Date of Patent: Sep. 6, 2022

(54) LOW PORTLAND SILICA-LIME CEMENTS

(71) Applicant: Halliburton Energy Services, Inc., Houston, TX (US)

(72) Inventors: Thomas Jason Pisklak, Cypress, TX (US); James Robert Benkley, Duncan, OK (US); John P. Singh, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/479,831

(22) PCT Filed: Feb. 22, 2017

(86) PCT No.: PCT/US2017/018928
§ 371 (c)(1),
(2) Date: Jul. 22, 2019

(87) PCT Pub. No.: WO2018/156114
PCT Pub. Date: Aug. 30, 2018

(65) Prior Publication Data
US 2020/0332643 A1    Oct. 22, 2020

(51) Int. Cl.
*E21B 47/005* (2012.01)
*C04B 28/04* (2006.01)
*C04B 28/18* (2006.01)
*C04B 14/04* (2006.01)
(Continued)

(52) U.S. Cl.
CPC .......... *E21B 47/005* (2020.05); *C04B 14/04* (2013.01); *C04B 28/04* (2013.01); *C04B 28/18* (2013.01); *C04B 40/0032* (2013.01); *C09K 8/467* (2013.01)

(58) Field of Classification Search
None
See application file for complete search history.

(56) References Cited

U.S. PATENT DOCUMENTS

| 3,539,364 A * | 11/1970 | Haddeland | C10L 3/04 |
| | | | 502/410 |
| 4,169,734 A * | 10/1979 | Brezny | C04B 35/047 |
| | | | 501/110 |
| 5,374,309 A | 12/1994 | Piniecki | |

(Continued)

FOREIGN PATENT DOCUMENTS

| CN | 101781096 | 7/2010 |
| CN | 105829642 | 8/2016 |

(Continued)

OTHER PUBLICATIONS

Li et al. "Modeling and Optimization of Cement Raw Materials Blending Process" Mathematical Problems in Engineering vol. 2012, Article ID 392197. 2012 pp. 1-20. (Year: 2012).*

(Continued)

*Primary Examiner* — Charles R Nold
(74) *Attorney, Agent, or Firm* — Thomas Rooney; C. Tumey Law Group PLLC (57) ABSTRACT

Methods of wellbore cementing are provided. A method of cementing may comprise: calculating a lime to silica correlation for two or more cementitious components of a cement composition; and adjusting a concentration of at least one of the cementitious components such that the lime to silica correlation meets or exceeds a target.

3 Claims, 2 Drawing Sheets

(51) Int. Cl.
*C04B 40/00* (2006.01)
*C09K 8/467* (2006.01)

(56) References Cited

U.S. PATENT DOCUMENTS

| | | | |
|---|---|---|---|
| 5,439,056 A * | 8/1995 | Cowan | C09K 8/46 166/292 |
| 7,607,484 B2 | 10/2009 | Roddy et al. | |
| 7,631,692 B2 | 12/2009 | Roddy et al. | |
| 7,806,183 B2 | 10/2010 | Roddy et al. | |
| 7,892,352 B2 | 2/2011 | Roddy et al. | |
| 8,281,859 B2 | 10/2012 | Roddy et al. | |
| 8,333,240 B2 | 12/2012 | Roddy et al. | |
| 8,486,869 B2 | 7/2013 | Brenneis et al. | |
| 8,529,689 B2 | 9/2013 | Lisowski et al. | |
| 8,609,592 B2 | 12/2013 | Guenthensperger et al. | |
| 8,609,595 B2 | 12/2013 | Morgan et al. | |
| 8,851,173 B2 | 10/2014 | Brothers et al. | |
| 8,997,578 B2 | 4/2015 | Morgan et al. | |
| 9,023,150 B2 | 5/2015 | Brenneis et al. | |
| 9,212,534 B2 | 12/2015 | Ballew et al. | |
| 9,505,972 B2 | 11/2016 | Iverson et al. | |
| 9,644,132 B2 | 5/2017 | Morgan et al. | |
| 10,370,579 B2 | 8/2019 | Agapiou et al. | |
| 11,174,198 B2 | 11/2021 | Morgan et al. | |
| 2008/0066652 A1 | 3/2008 | Fraser et al. | |
| 2008/0092780 A1 | 4/2008 | Bingamon et al. | |
| 2013/0340652 A1 | 12/2013 | Nagata et al. | |
| 2017/0001911 A1 | 1/2017 | Pisklak et al. | |
| 2017/0364607 A1 | 12/2017 | Kaushik et al. | |

FOREIGN PATENT DOCUMENTS

| | | | |
|---|---|---|---|
| CN | 105980515 | 4/2019 | |
| EP | 0056700 A2 * | 7/1982 | ............. C04B 22/00 |
| RU | 2021488 C1 | 10/1994 | |
| RU | 2433970 C2 | 11/2011 | |
| RU | 2551605 C2 | 5/2015 | |
| UZ | 3133 C | 8/2006 | |
| WO | 2015152860 | 10/2015 | |

OTHER PUBLICATIONS

Search Report with partial translation for Russian Patent Application No. 2019120857 dated Feb. 17, 2020.
Chinese Office Action and Search Report with English Translation for Application No. 201780083298.9 dated Dec. 23, 2020.
GCC Examination Report for Application No. GC 2018-34791 dated Jan. 27, 2020.
Freitas, A. A. et al. From lime to silica and alumina: systematic modeling of cement clinkers using a general force-field. Physical Chemistry Chemical Physics. May 4, 2015. 17(28), pp. 18477-18494.
ISRWO International Search Report and Written Opinion for PCT/US2017/018928 dated Oct. 31, 2017.
Chinese Office Action for Application No. 201780083298.9 dated Jan. 23, 2022 with English translation.

* cited by examiner

LOW PORTLAND SILICA-LIME CEMENTS

BACKGROUND

In well cementing, such as well construction and remedial cementing, cement compositions are commonly utilized. Cement compositions may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string may function to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

A particular challenge in well cementing is the development of satisfactory mechanical properties in a cement composition within a reasonable time period after placement in the subterranean formation. Blending pozzolans with Portland cement is a known technique to save on slurry costs. However, due to factors such as insufficient reactivity of the pozzolan, the amount of Portland replaced by the pozzolan may be limited to about 40-50%. The process of selecting the components of the cement composition are usually done by a best guess approach by utilizing previous slurries and modifying them until a satisfactory solution is reached. The cement components available in any one particular region may vary in composition from those of another region thereby further complicating the process of selecting a correct slurry. The process may be time consuming and the resulting slurry may not be the least expensive slurry.

BRIEF DESCRIPTION OF THE DRAWINGS

These drawings illustrate certain aspects of some of the embodiments of the present invention, and should not be used to limit or define the invention.

DETAILED DESCRIPTION

The present disclosure may generally relate to cementing methods and systems. Provided herein are methods that may include designing a cement composition that takes into account the physiochemical properties of each cementitious component and improves the cement composition design by determining a ratio of lime to silica to provide the desired cement properties. In particular, the physiochemical properties may include the mineral composition of each cementitious component. The cementitious components may affect the final set mechanical properties of the cement composition as well as the dynamic or time based properties such as mixability, rheology, viscosity, and others. Every cementitious component may affect one or more of the properties mentioned.

In previous Portland cement based cement composition designs, a silica source may be added as a filler to reduce cost without taking into account the reactivity of the materials. A silica source (e.g., pozzolans) may be relatively unreactive or inert when compared to the reactivity of a Portland cement. The cement composition design process disclosed herein may comprise turning the relatively unreactive silica source into a relatively more reactive component in order to increase the overall mechanical properties of the composition. Reactivity of the silica source may be increased by controlling the amount of lime in the composition available to react with the silica source. A cement composition as disclosed herein may be generally categorized as a synthetic Portland cement composition. Although the cement composition disclosed herein may not match the oxide concentration of a Portland cement, the cement composition may meet or exceed the mechanical properties of a cement composition based on Portland cement.

The cement compositions may generally comprise water, Portland cement, a silica source, and lime. The cement compositions may comprise a density suitable for a particular application. The cement compositions may have any suitable density, including, but not limited to, in the range of about 8 pounds per gallon ("ppg") to about 16 ppg (1 g/cm$^3$ to 1.9 g/cm$^3$). In foamed examples, the foamed cement compositions may have a density in the range of about 8 ppg to about 13 ppg (1 g/cm$^3$ to 1.6 g/cm$^3$) (or even lower). The cement compositions may comprise other means to reduce their densities, such as hollow microspheres, low-density elastic beads, or other density-reducing additives known in the art. Those of ordinary skill in the art, with the benefit of this disclosure, should recognize the appropriate density for a particular application.

The water used in the cement compositions may include, for example, freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may undesirably affect other components in the cement composition. The water may be included in an amount sufficient to form a pumpable slurry. The water may be included in the cement compositions in any suitable range, including, but not limited to, in the range of about 40% to about 200% by weight of cementitious components ("bwoc") present in the cement composition. As used herein, the term "cementitious component" refers to materials that possess cementitious properties, such as materials with hydraulic or pozzolanic activity, including Portland cement and the silica source, among others. For the purposes of this disclosure, lime is also considered a cementitious component as it reacts with the silica source in the pozzolanic reaction. In some examples, the water may be included in an amount in the range of about 40% to about 150% bwoc. Those of ordinary skill in the art, with the benefit of this disclosure, should be able to select an appropriate amount and type of water for a particular application.

Portland cements that are suited for use in the present disclosure may be classified as Classes A, C, G, and H cements according to American Petroleum Institute, API Specification for Materials and Testing for Well Cements, API Specification 10, Fifth Ed., Jul. 1, 1990. In addition, in some examples, cements suitable for use in the present invention may be classified as ASTM Type I, II, III, or V. Cement compositions that are considered "low Portland" may be used, in that the cement compositions may comprise Portland cement in any amount of about 50% or less by weight of cementitious components ("bwoc") present in the composite cement composition. The Portland cement may be present in the cement compositions in any suitable amount, including, but not limited to amounts in the range of about 0% to about 50% bwoc. In some examples the Portland cement may be present in an amount ranging between any of and/or including any of about 1%, about 5%, about 10%, about 20%, about 40%, or about 50% bwoc. In addition, cement compositions may also be designed that are free (or essentially free) of Portland cement. Those of ordinary skill in the art, with the benefit of this disclosure, should be able to select an appropriate amount of Portland cement for a particular application.

The cement compositions may further comprise a silica source. As used herein, the term "silica source" refers to a material that dissolves or otherwise dissociates to provide silicic acid that can react to form a cement product. By inclusion of the silica source, a different path may be used to arrive at a similar product as from Portland cement. A pozzolanic reaction may be induced wherein silicic acid ($H_4SiO_4$) and portlandite ($Ca(OH)_2$) react to form a cement product (calcium silicate hydrate). If other compounds, such as, aluminate, are present in the silica source, additional reactions may occur to form additional cement products, such as calcium aluminate hydrates. Calcium hydroxide, or lime, necessary for the reaction may be provided from other cement components, such as Portland cement, or may be separately added to the cement composition. Examples of suitable silica sources may include, but are not limited to, fly ash, slag, calcined clays, silica fume, crystalline silica, silica flour, cement kiln dust ("CKD"), zeolite, agricultural waste ash, and natural pozzolans, among others. Certain of these silica sources will be discussed in more detail below. Suitable silica sources may be generally classified as into three general categories including mined materials, waste materials, and bio-ashes. Mined materials are natural silica sources generally present in the Earth's surface. Waste materials may generally be waste materials from industrial sources. Bio-ashes may generally be the product of intentional combustion of agricultural, municipal, and industrial organic wastes. Bio-ashes may include, but are not limited to, agricultural waste ash, such as rice husk ash, sugar cane ash, and bagasse ash. Where present, the silica source generally may be included in the cement composition in an amount sufficient to provide the desired compressive strength, density, and/or cost, among other considerations.

The silica source, or sources, may be present in the cement compositions in any amount suitable for a particular application, including, but not limited to, amounts in the range of about 10% to about 100% bwoc, from about 50% to about 100% bwoc, from about 50% to about 80% bwoc, or from 80% about 100% bwoc. In some examples the silica source may be present in an amount ranging between any of and/or including any of about 1%, about 5%, about 10%, about 20%, about 40%, about 60%, about 80%, or about 90% bwoc. Those of ordinary skill in the art, with the benefit of this disclosure, should be able to select an appropriate type and amount of silica source for a particular application.

An example of a suitable silica source may comprise fly ash. A variety of fly ashes may be suitable, including fly ash classified as Class C and Class F fly ash according to American Petroleum Institute, API Specification for Materials and Testing for Well Cements, API Specification 10, Fifth Ed., Jul. 1, 1990. Class C fly ash comprises both silica and lime, so it may set to form a hardened mass upon mixing with water. Class F fly ash generally does not contain a sufficient amount of lime to induce a cementitious reaction, therefore, an additional source of calcium ions may be necessary for a composite cement composition comprising Class F fly ash. In some embodiments, lime may be mixed with Class F fly ash in an amount in the range of about 0.1% to about 100% by weight of the fly ash. In some instances, the lime may be hydrated lime. Suitable examples of fly ash comprise, but are not limited to, POZMIX© A cement additive, commercially available from Halliburton Energy Services, Inc., Houston, Tex.

Another example of a suitable silica source may comprise slag. Slag is generally a by-product in the production of various metals from their corresponding ores. By way of example, the production of cast iron may produce slag as a granulated, blast furnace by-product wherein the slag generally comprises the oxidized impurities found in iron ore. Slag generally does not contain sufficient basic material, so slag may be used with a base to produce a settable composition that may react with water to set to form a hardened mass. Examples of suitable sources of bases include, but are not limited to, sodium hydroxide, sodium bicarbonate, sodium carbonate, lime, and combinations thereof.

Another example of a suitable silica source may comprise silica fume. Silica fume may alternatively be referred to as "microsilica" or "condensed silica fume." Silica fume is generally a byproduct material that may be obtained, for example, by reduction of quartz with coal in the manufacture of certain alloys. Silica fume may be processed after recovery, for example, to control particle size. Silica fume may be extremely fine, for example, with a mean particle size of less than 1 micron and, alternatively, less than 0.2 microns. The mean particle size, as used herein, corresponds to d50 values as measured by particle size analyzers such as those manufactured by Malvern Instruments, Worcestershire, United Kingdom. Silica fume may have a high surface area and is generally available in either a powder form or liquid.

Another example of a suitable silica source may comprise CKD. Cement kiln dust or "CKD", as that term is used herein, refers to a partially calcined kiln feed which is removed from the gas stream and collected, for example, in a dust collector during the manufacture of cement. Usually, large quantities of CKD are collected in the production of cement that are commonly disposed of as waste. Disposal of the CKD as waste can add undesirable costs to the manufacture of the cement, as well as the environmental concerns associated with its disposal.

Another example of a suitable silica source may comprise zeolite. Zeolites generally are porous alumino-silicate minerals that may be either a natural or synthetic material. Natural zeolites may be mined from the Earth's surface. Synthetic zeolites may also be used, which are lab created. Synthetic zeolites are based on the same type of structural cell as natural zeolites, and may comprise aluminosilicate hydrates. As used herein, the term "zeolite" refers to all natural and synthetic forms of zeolite. Examples of zeolites may include, without limitation, mordenite, zsm-5, zeolite x, zeolite y, zeolite a, etc. Furthermore, examples comprising zeolite may comprise zeolite in combination with a cation such as $Na^+$, $K^+$, $Ca^{2+}$, $Mg^{2+}$, etc. Zeolites comprising cations such as sodium may also provide additional cation sources to the cement composition as the zeolites dissolve.

Another example of a silica source may comprise an agricultural waste ash. Examples of agricultural waste ash that may be used in the composite cement composition comprise, for example, wood (e.g., sawdust, bark, twigs, branches, other waste wood) ash, tree leave ash, corn cob ash, rice hull ash, cane (e.g., sugar cane) ash, bagasse ash, grain (e.g., amaranth, barley, corn flaxseed, millet, oat, quinoa, rye, rice, wheat etc.) and related by-product(s) (e.g., husks, hulls, etc.) ash, orchard ash, vine trimming ash, grass (e.g., Korai, Tifton, native shiba, etc.) ash, straw ash, ground nut shell ash, legume (e.g., soybean) ash, and combinations thereof.

Another example of a suitable silica source may comprise volcanic rock. Certain volcanic rocks may exhibit cementitious properties, in that they may set and harden in the presence of hydrated lime and water. The volcanic rock may also be ground, for example. Generally the volcanic rock may have any particle size distribution as desired for a particular application. In certain examples, the volcanic rock may have a mean particle size in the mange of from about 1 micron to about 200 microns. The mean particle size corresponds to d50 values as measured by particle size analyzers such as those manufactured by Malvern Instruments, Worcestershire, United Kingdom. One of ordinary skill in the art, with the benefit of this disclosure, should be able to select a volcanic rock and particle size suitable for use for a chosen application.

Other natural pozzolans may be a suitable silica source. Natural pozzolans are generally present on the Earth's surface and may exhibit pozzolanic activity. Suitable natural pozzolans may comprise, diatomaceous earth, volcanic ash, tuff, metakaolin, calcined clays, shale (e.g., calcined shale, opaline shale, etc.), and combinations thereof. The natural pozzolans may be ground or unground. Natural pozzolans may comprise materials, such as calcined clays, metakaolin, and calcined shale, which have been heat treated, for example, in a kiln to enhance their pozzolanic activity. Generally, the natural pozzolans may have any particle size distribution as desired for a particular application. The natural pozzolans may have a mean particle size suitable for a particular application, including, but not limited to, a range of from about 0.1 microns to about 200 microns, or even smaller. In specific examples, the natural pozzolans may have a mean particle size in a range of from about 1 micron to about 200 micron, from about 5 microns to about 100 microns, or from about 10 micron to about 50 microns. One of ordinary skill in the art, with the benefit of this disclosure, should be able to select a natural pozzolan and particle size suitable for use for a chosen application.

The cement compositions may comprise lime. Lime may be present in the cement composition in different forms, including as calcium oxide and/or calcium hydroxide. As used herein, the term "lime" is intended to include both calcium oxide and calcium hydroxide. Calcium hydroxide is also commonly referred to as hydrated lime and slaked lime. In some examples, the hydrated lime may be provided as quicklime (calcium oxide) which hydrates when mixed with water to form the hydrated lime. In addition to the additional lime added as a separate component, at least a portion of the lime in cement composition may be also provided from other cement components. For example, the hydraulic reaction of Portland cement with water may release hydrated lime into the cement composition. In addition, the silica sources may also contain lime or release lime into the cement composition. Lime present in a silica source as CaO may be referred to as free lime if it is not bound to other minerals. The hydrated lime may be included in examples of the cement compositions, for example, to react with the silica source. Where present, the lime may be included in the cement compositions in an amount in the range of from about 10% to about 100% bwoc, for example. In some examples, the hydrated lime may be present in an amount ranging between any of and/or including any of about 10%, about 20%, about 40%, about 60%, about 80%, or about 100% bwoc. One of ordinary skill in the art, with the benefit of this disclosure, should recognize the appropriate amount of hydrated lime to include for a chosen application.

In some examples, the cement compositions may comprise a calcium source other than hydrated lime. In general, calcium and a high pH, for example a pH of 7.0 or greater, may be needed for certain cementitious reactions to occur. A potential advantage of hydrated lime may be that calcium ions and hydroxide ions are supplied in the same molecule. In another example, the calcium source may be $Ca(NO_3)_2$ or $CaCl_2$) with the hydroxide being supplied form NaOH or KOH, for example. One of ordinary skill would understand the alternate calcium source and hydroxide source may be included in a cement composition in the same way as hydrated lime. For example, the calcium source and hydroxide source may be included in a silica source-to-hydrated-lime weight ratio of about 10:1 to about 1:1 or a ratio of about 3:1 to about 5:1. Where present, the alternate calcium source and hydroxide source may be included in the cement compositions in an amount in the range of from about 10% to about 100% by weight of the silica source, for example. In some examples, the alternate calcium source and hydroxide source may be present in an amount ranging between any of and/or including any of about 10%, about 20%, about 40%, about 60%, about 80%, or about 100% by weight of the silica source. One of ordinary skill in the art, with the benefit of this disclosure, should recognize the appropriate amount of alternate calcium source and hydroxide source to include for a chosen application.

The cement composition may further comprise other additives suitable for use in cementing operations. Examples of such additives include, but are not limited to: weighting agents, retarders, accelerators, activators, gas control additives, lightweight additives, gas-generating additives, mechanical-property-enhancing additives, lost-circulation materials, filtration-control additives, fluid-loss-control additives, defoaming agents, defoaming agents, foaming agents, transition time modifiers, dispersants, thixotropic additives, suspending agents, and combinations thereof. One of ordinary skill in the art, with the benefit of this disclosure, should be able to select an appropriate additive for a particular application.

The cement compositions may be prepared using any suitable technique. The cementitious components, such as the Portland cement, silica source, and/or lime may be dry blended prior to combination with the water to form the cement composition. This dry blend may be prepared offsite and then transported to the well site, for example, where it may be combined with the water. Additional solid cement additive may also be included in the dry blend. Other suitable techniques may be used for preparation of the cement compositions as should be appreciated by those of ordinary skill in the art in accordance with the present disclosure.

As previously described, the silica source may dissolve or otherwise form silicic acid that can react with calcium hydroxide to form a cement product. A pozzolanic reaction may be induced wherein silicic acid ($H_4SiO_4$) and portlandite ($Ca(OH)_2$ react to form a cement product (calcium silicate hydrate). This pozzolanic reaction between silicic acid ($H_4Si_4$) and portlandite ($Ca(OH)_2$) may progress according to the following equations. First, silica may be hydrated to form silicic acid and calcium oxide may be hydrated to form portlandite or hydrated lime. As will be appreciated by those of ordinary skill in the art, calcium hydroxide may also be provided from other components in the cement composition, for example, by hydraulic reaction of Portland cement. Next, silicic acid and hydrated lime may react to form calcium silicate hydrate). If other compounds, such as, aluminate, are present in the silica source, additional reactions may occur to form additional cementitious products, such as calcium aluminate hydrates.

$$SiO_2 + 2H_2O \rightarrow H_4SiO_4$$

$$CaO + H_2O \rightarrow Ca(OH)_2$$

$$H_4SiO_4 + Ca(OH)_2 \rightarrow CaO_{1.7} \cdot SiO_2 \cdot xH_2O$$

The reaction may not be straightforward as the different silica sources may have different solubility and hydration rates. The stoichiometry of the reaction may also not straight forward due to the differing solubility of the reactants. If the amount of either reactant is different than the ideal amount, then the reaction may slow or stop. One way to control the reaction may be to provide a ratio of available lime and silicic acid that is sufficient to drive the reaction. In other words, concentrations of silica sources and/or lime may be selected for the cement composition to provide this ratio.

A cement composition may be designed to have a target lime to silica weight ratio. Additionally, the weight ratio may also be a molar ratio, molal ratio, or any other equivalent way of expressing a relative amount of silica to lime. Any suitable target lime to silica weight ratio may be selected to provide the desired reaction, including, but not limited to, a target lime to silica ratio weight ranging from about 10/90 lime to silica by weight to about 40/60 lime to silica by weight, for example, be about 10/90 lime to silica by weight, about 20/80 lime to silica by weight, about 30/70 silica to lime by weight, or about 40/60 lime to silica by weight. Lime is understood to mean any source of lime such as free lime as well as lime that may be generated though other cementitious reactions. It should also be understood that a lime to silica ratio may also be expressed in equivalent terms of a silica to lime ratio. For example, a lime to silica ratio of 20/80 is equivalent to a silica to lime ratio of 80/20.

As discussed, a silica ($SiO_2$) to lime (CaO) ratio may be used to improve a cement by defining a target lime to silica ratio. The lime to silica ratio may be defined as correlation between lime and silica. Although only one correlation between a specific form of silica and lime has been previously discussed, one of ordinary skill would appreciate that any correlation between lime and silica in any form may be used. For example, a correlation between elemental silicon (Si) and elemental calcium (Ca) as well as any other correlations between the various oxides of silicon and oxides of calcium may be used. In some examples an indirect measurement of the amount of silica to lime may be used. For example, the amount of lime in a specified sample may be determined by a titration with a known concentration of an acid. The resulting pH after a known volume of acid is added may be determined and then the concentration of lime in the sample may be back calculated. The indirect correlation between the pH at the end of the titration and silica may then be used to design a cement composition. One of ordinary skill would appreciate that there are numerous other direct and indirect methods of generating a correlation relating to lime and silica.

Designing the cement composition may comprise any of a number of different steps. Two or more cementitious component and their concentrations may be selected for an initial cement composition. The lime to silica ratio of the two or more cementitious components may be calculated. The lime to silica ratio may be determined using any suitable technique. Calculating the lime to silica ratio may include, determining a total amount of silica and a total amount of lime in the two or more cementitious components and then taking the ratio of the lime to the silica. For the purposes of the lime to silica ratio, the lime may be considered to be either calcium oxide or calcium hydroxide. For example, the lime to silica ratio may be determined by measuring the available silica and lime for a given cementitious component using standard laboratory techniques. Measuring the available silica and lime may use an oxide analysis, such as x-ray fluorescence spectroscopy or another suitable technique. Once the laboratory analysis has been performed, the data may be categorized, including categorizing the cementitious components by oxide composition, which may include silica content, lime content (e.g., calcium oxide), alumina content and other oxide content. The categorization may generally comprise listing in a table the silica content, calcium oxide content, and alumina content for each tested cementitious component, including the Portland cement, silica source, and/or hydrated lime. Additionally, the rate of dissolution of each component may be categorized.

If the calculated lime to silica ratio cement composition does not meet (or exceed) the target lime to silica ratio, the concentration of one or more cementitious components may be adjusted until the target lime to silica ratio may be met or exceed. In some examples, a concentration of lime (as a separate cementitious component) in the cement composition may be adjusted if there is insufficient lime. To determine how much lime to add, the net amount of silica and lime contribution from each cement component may be determined using the laboratory techniques previously described. The ratio of silica to lime may then be determined and more lime may be added until the desired ratio is achieved. If there is insufficient silica, the silica source may be adjusted until the target ratio is achieved.

One potential advantage of balancing the lime to silica ratio may be that the total amount of Portland cement required to meet or exceed the engineering requirements may be relatively low. Generally, a cement engineer or operator may determine the required engineering properties of a cement composition for a particular well. The silica sources available in the particular region where the cement composition is to be pumped may have different levels of oxides. The available silica sources or resources may be cataloged and laboratory testing run on each of the materials. The laboratory testing may include, for example, silica content, alumina content, calcium oxide, and other oxide content. The cement engineer may start with a cement composition of, for example, 30% by weight Portland cement with the balance weight percent being various silica sources previously tested. A target lime to silica ratio of be 20/80 may be selected. By using the weight percent of each component and the laboratory testing that was previously done, the lime to silica ratio of the cement composition may be determined. If the lime or silica is off, either may be adjusted by adding lime or more silica (e.g., by adding more silica source). Once the silica-lime balance is completed the cement composition may be tested for mechanical or engineering properties. Several cement compositions may be made with varying levels of Portland cement. For example, a cement composition may comprise about 10% to about 30% Portland cement. In some examples, a cement composition may comprise about 10%, about 15%, about 20%, about 25%, or about 30% Portland cement by weight. One or ordinary skill, with the benefit of this disclosure, should be able to select a Portland cement weight percent, perform oxide analysis, determine the target lime to silica ratio, and adjust the weight percent of each component to create a slurry with the required engineering properties.

Any of the exemplary cement compositions disclosed herein may be introduced into a subterranean formation and allowed to set. As used herein, introducing the cement composition into a subterranean formation includes introduction into any portion of the subterranean formation, into near wellbore region surrounding the wellbore, or into both. In primary cementing applications, for example, the cement compositions may be introduced into the annular space between a conduit located in a wellbore and the walls of the wellbore (and/or a larger conduit in the wellbore), wherein the wellbore penetrates the subterranean formation. The cement composition may be prepared and allowed to set in the annular space to form an annular sheath of hardened cement. The cement composition may form a barrier that prevents the migration of fluids in the wellbore. The cement composition may also, for example, support the conduit in the wellbore. In remedial cementing applications, the cement compositions may be used, for example, in squeeze cementing operations or in the placement of cement plugs. By way of example, the cement compositions may be placed in a wellbore to plug an opening (e.g., a void or crack) in the formation, in a gravel pack, in the conduit, in the cement sheath, and/or between the cement sheath and the conduit (e.g., a microannulus).

Statement 1. A method comprising: calculating a lime to silica correlation for two or more cementitious components of a cement composition; and adjusting a concentration of at least one of the cementitious components such that the lime to silica correlation meets or exceeds a target.

Statement 2. The method of statement 1 further comprising: preparing the cement composition; and allowing the cement composition to set.

Statement 3. The method of statement 1 of statement 2 further comprising introducing the cement composition into a subterranean formation.

Statement 4. The method of any previous statement wherein the cement composition is introduced into the subterranean formation using one or more pumps.

Statement 5. The method of any one of statements 2 to 4 wherein preparing comprises mixing components of the cement compositions using mixing equipment, the components comprising two or more cementitious components and water.

Statement 6. The method of any previous statement wherein the cementitious components comprise at least one cementitious component selected from the group consisting of Portland cement, silica sources, lime, and combinations thereof.

Statement 7. The method of statement 6 wherein the cementitious components comprise the Portland cement in an amount of about 10% to about 50% of the cementitious components.

Statement 8. The method of statement 6 or statement 7 wherein the silica sources comprises at least one source selected from the group consisting of fly ash, calcined clay, slag, silica fume, crystalline silica, silica flour, cement kiln dust, zeolite, agricultural waste ash, natural pozzolans, and combinations thereof.

Statement 9. The method of any previous statement wherein the cement composition further comprises one or more additives selected from the group consisting of weighting agents, retarders, accelerators, activators, gas control additives, lightweight additives, gas-generating additives, mechanical-property-enhancing additives, lost-circulation materials, filtration-control additives, fluid-loss-control additives, defoaming agents, defoaming agents, foaming agents, transition time modifiers, dispersants, thixotropic additives, suspending agents, and combinations thereof.

Statement 10. The method of any previous statement wherein the lime to silica correlation is a lime to silica weight ratio, and wherein the lime to silica weight ratio is about 10/90 to about 40/60.

Statement 11. The method of any previous statement further comprising a step of calculating a time dependent concentration of lime and silica and selecting additional cementitious components to include in the cement composition wherein the additional cementitious components are selected based on a dissolution rate for each of the additional cementitious components.

Statement 12. The method of any previous statement further comprising pumping the cement composition through a conduit and into a wellbore annulus such that the cement composition sets to form a cement sheath in the wellbore annulus.

Statement 13. The method of any previous statement further comprising performing an oxide analysis on the two or more cementitious components.

Statement 14. A method of improving a lime to silica ratio of a cement blend comprising: selecting a target lime to silica ratio; performing an oxide analysis on the cementitious components of the cement blend; calculating a total amount of silica and lime in the cement blend from the oxide analysis; calculating the lime to silica ratio of the cement blend; and calculating a concentration of additional lime needed in the cement blend to make the lime to silica ratio greater than or equal to the target lime to silica ratio.

Statement 15. The method of statement 14 wherein the target lime to silica ratio is a weight ratio, and wherein the weight ratio is about 10/90 to about 40/60.

Statement 16. The method of statement 14 or statement 15 further comprising a step of calculating a dissolution rate for each of the cementitious components.

Statement 17. The method of any one of statements 14 to 16 further comprising a step of calculating a time dependent concentration of lime and silica and selecting additional cementitious components to include in the cement blend wherein the additional cementitious components are selected based on a dissolution rate for each cementitious component.

Statement 18. A system for generating a cement composition comprising: a plurality of cementitious components; and a computer system configured to accept input from a user and generate concentrations of the cementitious components for the cement composition, wherein the computer system is configured to generate the concentrations of the cementitious components based on a target lime to silica correlation.

Statement 19. The system of statement 18 wherein the computer system is further configured to improve the cement compositions by calculating a lime to silica weight ratio and adjusting the relative amount of each of the cementitious components to meet or exceed the target lime to silica correlation.

Statement 20. The system of statement 18 or statement 19 further comprising a database, wherein the database comprises the cementitious components, a cost corresponding to each of the cementitious components, an oxide analysis corresponding to each of the cementitious components, and dissolution data corresponding to each of the cementitious components.

Statement 21. The system of any one of statements 18 to 20 wherein the target lime to silica correlation is defined by a user or automatically selected by the computer system.

Statement 22. The system of any one of statements 18 to 21 wherein the target lime to silica correlation is a lime to silica weight ratio, and wherein the lime to silica weight ratio is about 10/90 to about 40/60.

Figure 1:
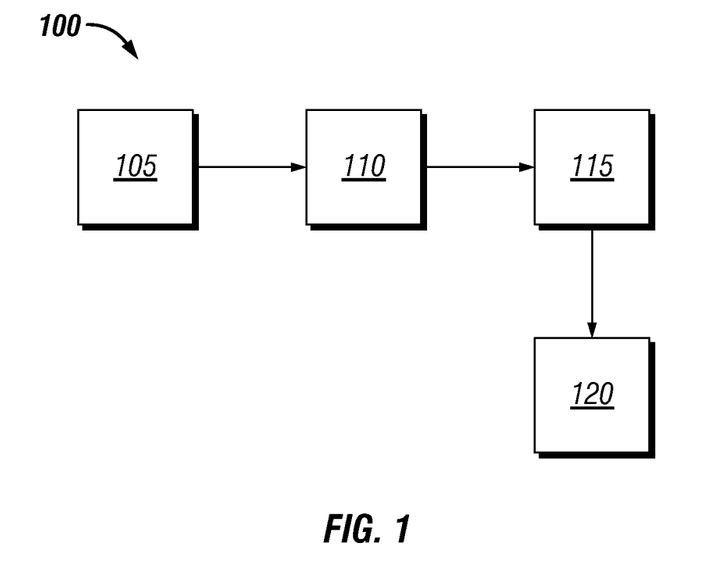
FIG. 1 is a schematic illustration of an example system for analyzing cement components.

Examples of the methods of using the silica-lime balancing technique will now be described in more detail with reference to FIG. 1. A system 100 for analyzing the cementitious components is illustrated. The system 100 may comprise a cementitious component sample 105, analytical instrument 110, and computer system 115. Cementitious component sample 105 may be any cementitious component (e.g., Portland cement, silica source, lime, etc.) of interest. The cementitious component sample may be placed or fed into analytical instrument 110. In some examples, analytical instrument 110 may be configured to automatically feed cementitious component sample 105 into analytical instrument 110. Analytical instrument 110 may be configured to analyze the physical and chemical properties of cementitious component sample 105. As previously described, physical and chemical properties may comprise, data from oxide analysis and others tests. The data generated by analytical instrument 110 may be sent to computer system 115 for processing. Computer system 115 may comprise a processor, memory, internal storage, input and output means, network connectivity means, and/or other components common to computer systems. Computer system 115 may take the data from analytical instrument 110 as input and store it in the storage for later processing. Processing the data may comprise inputting the data into algorithms which compute a result. The computer system may be configured to analyze the oxide data from a sample and generate correlations, charts, and models related to solubility, time of dissolution, time dependent availability of oxides in solution, predicted reactivity, lime requirement, and others. The generated data and data generated from analytical instrument 110 may be stored in database 120. Database 120 may also comprise data about the cost of each cementitious component. Database 120 may be stored locally or on a network.

Figure 2:
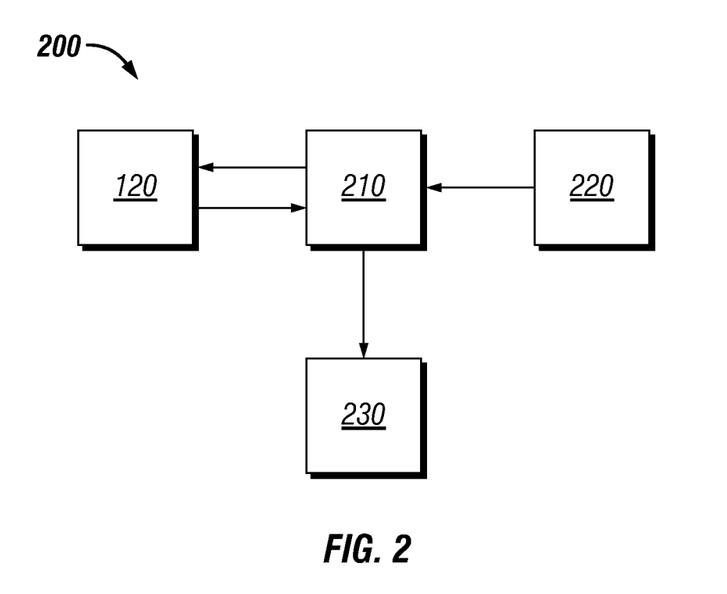
FIG. 2 is a schematic illustration of an example system for generating cement compositions.

Referring now to FIG. 2, a system 200 for generating cement compositions is illustrated. The system 200 may comprise database 120 as described in FIG. 1 and computer system 210. In some examples, computer system 210 may be the same computer system 115 of FIG. 1. A user input 220 may define engineering parameters such as the required compressive strength of a cement composition, the bottom hole static temperature of the wellbore, the required rheological properties of the slurry, the thickening time of the slurry, available cement materials, available cement additives, free fluid, permeability, pore pressure, frac gradient, mud weight, density, acid resistance, salt tolerance, and other parameters. Computer system 210 may be configured to input user input 220 and the predictive models, reactivity maps, and data stored in database 120 into a predictive cement algorithm. The predictive cement algorithm may generate a cement composition or compositions that meet the engineering requirements define by the user input 220. The output 230 of the predictive cement algorithm may contain the relative amounts of each cement component in the generated cement composition as well as the predicted material properties of the cement composition. In another example, a user may select a low Portland cement concentration and one or more silica sources as some of the engineering parameters. The meaning of a low Portland cement concentrations was previously discussed. A user may also select a target lime to silica ratio as part of the engineering parameters. In some examples, the predictive cement algorithm may automatically select a target lime to silica ratio or be configured to select the improved ratio based on the input from the user. The predictive cement algorithm may generate a cement composition comprising the selected Portland cement concentration and selected silica sources. To select the appropriate ratio of lime to silica, the algorithm may reference the oxide analysis and solubility data mentioned previously. The predictive cement algorithm may be configured to generate the concentrations of cementitious components based on the target lime to silica ratio. The predictive cement algorithm may be configured to meet or exceed the target lime to silica ratio by adjusting the concentration of one or more cementitious components including lime.

Although the predictive cement algorithm may generate a cement composition solely based on the lime to silica ratio of a user input or automatically chosen value, the algorithm may also generate a cement based on a combination of other factors. One factor may be availability of oxides and lime as a function of time and temperature. As previously described, silicic acid and portlandite may vary in concentration with time and temperature based on the solubility of a cementitious component. As previously described, the available cement components may have differing solubility rates which may also depend on the temperature of solution. A cement component may dissolute relatively slowly at ambient temperature but may dissolute relatively quicker at bottom hole static temperature. As such, the availability of oxides and lime from each component may be dependent not only on time, but also on the position of the cement composition in the wellbore. The predictive cement algorithm may generate a cement composition that maintains the selected lime to silica balance throughout the pozzolanic and other cement setting reactions by accounting for the time dependent availability of reactants. The predictive cement algorithm may also use cost data from database 120 to generate a cement composition that has the desired lime to silica ratio while also improving the cost of the composition. In some examples the predictive cement algorithm may generate a cement composition with a minimized or reduced cost.

Figure 3:
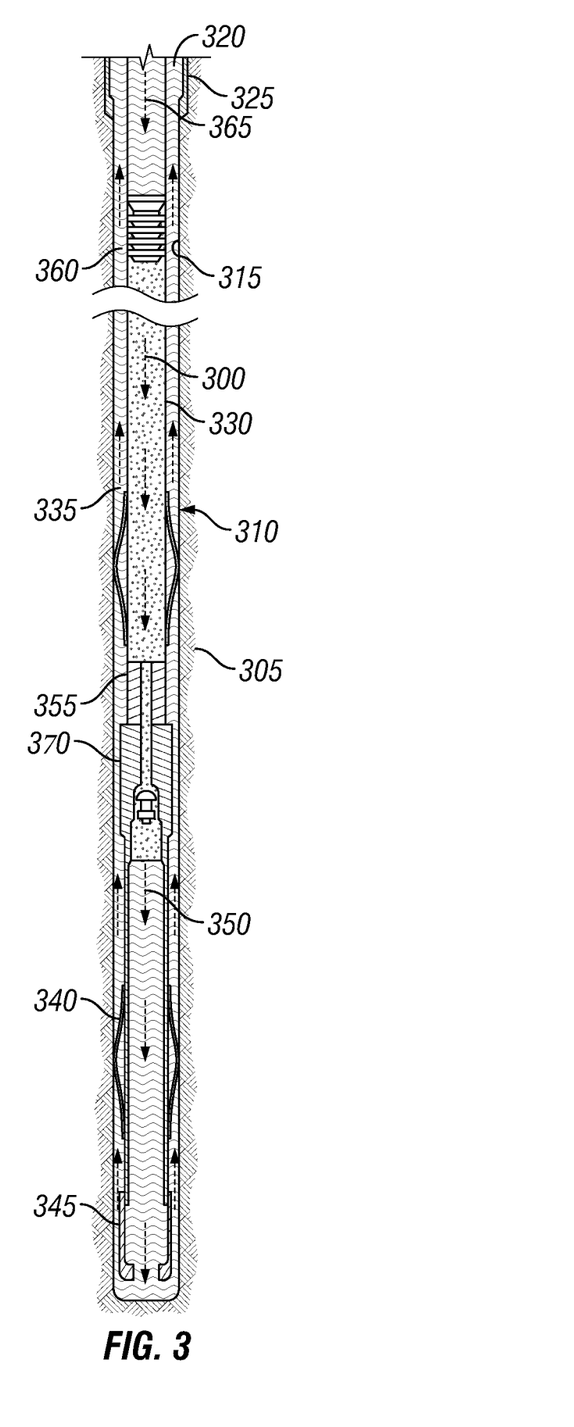
FIG. 3 is a schematic illustration of showing introduction of a cement composition into a wellbore.

Reference is now made to FIG. 3, illustrating use of a cement composition 300. Cement composition 300 may comprise any of the components described herein. Cement composition 300 may be designed, for example, using lime-silica balancing as described herein. Turning now to FIG. 3, the cement composition 300 may be placed into a subterranean formation 305 in accordance with example systems, methods and cement compositions. As illustrated, a wellbore 310 may be drilled into the subterranean formation 305. While wellbore 310 is shown extending generally vertically into the subterranean formation 305, the principles described herein are also applicable to wellbores that extend at an angle through the subterranean formation 305, such as horizontal and slanted wellbores. As illustrated, the wellbore 310 comprises walls 315. In the illustration, a surface casing 320 has been inserted into the wellbore 310. The surface casing 320 may be cemented to the walls 315 of the wellbore 310 by cement sheath 325. In the illustration, one or more additional conduits (e.g., intermediate casing, production casing, liners, etc.), shown here as casing 330 may also be disposed in the wellbore 310. As illustrated, there is a wellbore annulus 335 formed between the casing 330 and the walls 315 of the wellbore 310 and/or the surface casing 320. One or more centralizers 340 may be attached to the casing 330, for example, to centralize the casing 330 in the wellbore 310 prior to and during the cementing operation.

With continued reference to FIG. 3, the cement composition 300 may be pumped down the interior of the casing 330. The cement composition 300 may be allowed to flow down the interior of the casing 330 through the casing shoe 345 at the bottom of the casing 330 and up around the casing 330 into the wellbore annulus 335. The cement composition 300 may be allowed to set in the wellbore annulus 335, for example, to form a cement sheath that supports and positions the casing 330 in the wellbore 310. While not illustrated, other techniques may also be utilized for introduction of the cement composition 300. By way of example, reverse circulation techniques may be used that include introducing the cement composition 300 into the subterranean formation 305 by way of the wellbore annulus 335 instead of through the casing 330. As it is introduced, the cement composition 300 may displace other fluids 350, such as drilling fluids and/or spacer fluids that may be present in the interior of the casing 330 and/or the wellbore annulus 335. While not illustrated, at least a portion of the displaced fluids 350 may exit the wellbore annulus 335 via a flow line and be deposited, for example, in one or more retention pits. A bottom plug 355 may be introduced into the wellbore 310 ahead of the cement composition 300, for example, to separate the cement composition 300 from the fluids 350 that may be inside the casing 330 prior to cementing. After the bottom plug 355 reaches the landing collar 380, a diaphragm or other suitable device may rupture to allow the cement composition 300 through the bottom plug 355. The bottom plug 355 is shown on the landing collar 380. In the illustration, a top plug 360 may be introduced into the wellbore 310 behind the cement composition 300. The top plug 360 may separate the cement composition 300 from a displacement fluid 365 and also push the cement composition 300 through the bottom plug 355.

The disclosed cement compositions and associated methods may directly or indirectly affect any pumping systems, which representatively includes any conduits, pipelines, trucks, tubulars, and/or pipes which may be coupled to the pump and/or any pumping systems and may be used to fluidically convey the cement compositions downhole, any pumps, compressors, or motors (e.g., topside or downhole) used to drive the cement compositions into motion, any valves or related joints used to regulate the pressure or flow rate of the cement compositions, and any sensors (i.e., pressure, temperature, flow rate, etc.), gauges, and/or combinations thereof, and the like. The cement compositions may also directly or indirectly affect any mixing hoppers and retention pits and their assorted variations.

EXAMPLES

To facilitate a better understanding of the present embodiments, the following examples of some of the preferred embodiments are given. In no way should such examples be read to limit, or to define, the scope of the disclosure.

Example 1

An analysis was performed on several cementitious components to determine the composition of the oxides in each sample. The results are displayed in Table 1.

TABLE 1

Oxide analysis of Cementitious Components

| | Weight % | |
|---|---|---|
| | SiO2 | CaO |
| Portland Cement | 0 | 15 |
| Silicate | 90.3 | 1.1 |
| Metakaolin | 53.8 | 0 |
| Volcanic Rock | 77.4 | 0.5 |
| Hydrated Lime | 1.57 | 94.5 |
| Fly Ash, Type F | 63.9 | 2 |

Example 2

Several virtual cement composition designs were created with the analyzed cementitious components. The designs are presented in Tables 2-4 below. The target lime to silica ratio was to exceed 20/80 or 0.25. Virtual designs 2 and 3 would meet the criteria as they have a ratio of 0.27 and 0.58 respectively.

TABLE 2

Virtual Design 1

| Virtual Design 1 | Formulation (wt %) | g Silica | g Lime |
|---|---|---|---|
| Portland Cement | 30 | — | 4.5 |
| Fly Ash, Type F | 65.5 | 41.9 | 1.3 |
| Volcanic Rock | 0 | 0 | — |
| Hydrated Lime | 4.5 | — | 4.5 |
| Lime/Silica Ratio | = (4.5 + 1.3 + 4.5)/41.9 | | 0.245 |

TABLE 3

Virtual Design 2

| Virtual Design 2 | Formulation (wt %) | g Silica | g Lime |
|---|---|---|---|
| Portland Cement | 50 | — | 7.5 |
| Fly Ash, Type F | 50 | 32 | 1.0 |
| Volcanic Rock | 0 | 0 | — |
| Hydrated Lime | 0 | — | 0 |
| Lime/Silica Ratio | = (7.5 + 1.0)/32 | | 0.27 |

TABLE 4

Virtual Design 3

| Virtual Design 3 | Formulation (wt %) | g Silica | g Lime |
|---|---|---|---|
| Portland Cement | 70 | — | 10.5 |
| Fly Ash, Type F | 30 | 19.2 | 0.6 |
| Volcanic Rock | 0 | 0 | — |
| Hydrated Lime | 4.5 | — | 0 |
| Lime/Silica Ratio | = (10.5 + 0.6)/19.2 | | 0.58 |

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present invention may be modified and practiced in different but equivalent manners apparent to those skilled in the art having the benefit of the teachings herein. Although individual examples are discussed, the invention covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method comprising:
   first, providing a virtual cement design, the virtual cement design comprising cementitious components, wherein the cementitious components comprise Portland cement and a silica source, wherein the Portland cement is present in an amount of 50 wt. % or less in the virtual cement design, and wherein the silica source comprises at least once silica source selected from the group consisting of fly ash, slag, calcined clay, silica fume, crystalline silica, silica flour, cement kiln dust, zeolite, agricultural waste ash, natural pozzolans, and combinations thereof;
   then, providing an oxide analysis of each of the cementitious components of the virtual cement design;
   calculating a total amount of silica and lime in the virtual cement design from the oxide analysis;
   calculating the lime to silica ratio of the virtual cement design;
   selecting a target lime to silica ratio and calculating a concentration of additional lime needed in the cement blend to make the lime to silica ratio of the virtual cement design greater than or equal to the target lime to silica ratio;
   preparing a cement composition based on the virtual cement design, the cement composition comprising the cementitious components, water, and lime, wherein the lime is present in an amount such that a lime to silica ratio of the cement composition is greater than or equal to the target lime to silica ratio; and
   introducing the cement composition into a subterranean formation.

2. The method of claim 1 wherein the target lime to silica ratio is a weight ratio, and wherein the weight ratio is about 10/90 to about 40/60.

3. The method of claim 1 further comprising providing the cementitious components and water included in the cement composition and calculating a dissolution rate for each of the provided cementitious components in the water at a subterranean formation temperature and pressure, prior to the preparing the cement composition.

* * * * *